(No Model.) 9 Sheets—Sheet 1.

M. L. SEVERY.
TYPE WRITING MACHINE.

No. 476,319. Patented June 7, 1892.

Fig. 1.

WITNESSES:
Matthew M. Blunt
T. M. Foote

INVENTOR:
Melvin L. Severy
by his attorney
Alex L. Hayes (No Model.) 9 Sheets—Sheet 4.
M. L. SEVERY.
TYPE WRITING MACHINE.

No. 476,319. Patented June 7, 1892.

WITNESSES:
J. H. Bennett
Geo. W. Bennett

INVENTOR
Melvin L. Severy
by his attorney
Alex. L. Hayes.

(No Model.)  9 Sheets—Sheet 5.

M. L. SEVERY.
TYPE WRITING MACHINE.

No. 476,319.  Patented June 7, 1892.

WITNESSES:
Matthew M. Blunt.
T. M. Foote

INVENTOR:
Melvin L. Severy
by his attorney
Alby L. Hayes (No Model.)  9 Sheets—Sheet 6.

M. L. SEVERY.
TYPE WRITING MACHINE.

No. 476,319.  Patented June 7, 1892.

WITNESSES:  INVENTOR:

(No Model.) 9 Sheets—Sheet 7.

M. L. SEVERY.
TYPE WRITING MACHINE.

No. 476,319. Patented June 7, 1892.

WITNESSES:
Matthew M. Blunt.
T. M. Foote

INVENTOR:
Melvin L. Severy
by his attorney
Aly. L. Hayes

(No Model.) 9 Sheets—Sheet 8.

M. L. SEVERY.
TYPE WRITING MACHINE.

No. 476,319. Patented June 7, 1892.

WITNESSES:
Matthew M. Blunt
T. M. Foote

INVENTOR:
Melvin L. Severy
by his attorney
Alx. L. Hayes

(No Model.)  
9 Sheets—Sheet 9.

M. L. SEVERY.
TYPE WRITING MACHINE.

No. 476,319. Patented June 7, 1892.

WITNESSES:  
Matthew M. Blunt  
F. M. Foote

INVENTOR:  
Melvin L. Severy  
by his attorney  
Alvy. L. Hayes

UNITED STATES PATENT OFFICE.

MELVIN L. SEVERY, OF BOSTON, MASSACHUSETTS, ASSIGNOR, BY DIRECT AND MESNE ASSIGNMENTS, TO CHARLES F. HOWE, OF SAME PLACE, AND GEORGE KEMPTON, OF SHARON, MASSACHUSETTS, TRUSTEES.

TYPE-WRITING MACHINE.

SPECIFICATION forming part of Letters Patent No. 476,319, dated June 7, 1892.

Application filed January 6, 1890. Serial No. 336,115. (No model.)

*To all whom it may concern:*

Be it known that I, MELVIN L. SEVERY, of Boston, in the county of Suffolk and State of Massachusetts, have invented a new and useful Improvement in Type-Writing Machines, of which the following, taken in connection with the accompanying drawings, is a specification.

The type-writing machine which forms the subject of this application for Letters Patent of the United States belongs to that class of type-writing machines in which the type is supported in bars which are moved by the action of the keys to bring to a common center the type from which an impression is to be taken and in which machine the type is brought against the paper by the action of a force rendered operative on the depression of a key, and the invention relates, first, to the mechanism for effecting the movement of the bars supporting the type by means of a series of keys, whereby any desired type can be brought to the common center in position to form the impression upon the paper at the proper place; second, to the arrangement of the keys and construction and the mechanism whereby spaces are formed between letters and words; third, to the mechanism whereby the movement of a key brings into action the force by means of which the impression is made and automatically effects the longitudinal movement of the carriage and the consequent formation of spaces between the letters; fourth, to the device for effecting the impression of a letter by the movement of a type against the paper; fifth, to the construction of the inking device and the mechanism for operating the same; sixth, to the mechanism for arresting the longitudinal movement of the carriage at any desired point and for preventing the impression of a letter after this movement of the carriage is arrested, thereby securing perfect alignment on both sides of the printed matter and preventing the printing of letters upon one another at the end of a line; seventh, to the mechanism for releasing the pawls which act to effect the rotation of the roller carrying the paper to form spaces between the lines; eighth, to a device for removing the type from the paper after an impression has been made, and, ninth, to a device for indicating on the paper, when the roller has been turned back, the place where the next impression will be made.

In carrying this invention into effect the first part of the invention consists in the combination, substantially as hereinafter more fully set forth, of a series of bars, each provided with means for supporting one or more independent movable type and with a perforation under each type, which bars move in suitable guides upon a horizontal plate in lines radiating from a common center and are each respectively connected by suitable mechanism with a series of keys marked with the characters upon the type, which keys by their depression act upon the corresponding typebar to bring the type corresponding to the depressed key to the common center, and at the same time causes the operation of the spacing mechanism and also of the mechanism which effects the impression.

The second part of the invention consists in the combination, substantially as hereinafter more fully set forth, with the keys, of mechanism operated by the depression of a key to effect the longitudinal movement of the carriage after each impression to form the proper space between successive letters.

The third part of the invention consists in the combination, substantially as hereinafter more fully set forth, of a toothed wheel having a tendency to rotate by the action of a coiled spring a rack-bar on the carriage extending along the back of the machine and engaging with this toothed wheel, a shaft having fixed thereon a pinion which engages with the rack-bars, an escapement-wheel loose on this shaft, but connecting with the same by a ratchet and pawl, and two pawls on opposite sides of the escapement and connected together, one pawl being connected to the mechanism which effects the impression and removed from the escapement by the action of the spacing mechanism and the other at the same time engaging with the escapementwheel, whereby the rotation of this wheel and the consequent movement of the carriage are prevented from taking place until after the impression of a letter and the return of the other pawl.

The fourth part of the invention consists in the combination, substantially as hereinafter more fully set forth, of a vertical rod supported under the plate on which the type-bars move and having its extremity under a perforation on this plate at the common center to which a type is brought when it is desired to make an impression, a spring or its equivalent, which when released acts upon the rod to force its extremity against the bottom of the type which stands over the perforation in the plate, and mechanism operating on the depression of a letter-key to bring into action the force which operates the type-striking rod.

The fifth part of the invention consists in the combination, as hereinafter more fully set forth, of an inking-pad supported above the type-bars and composed of one or more layers of felt or other suitable material separated by a perforated plate, mechanism, as described, operated by the action of the impression mechanism to effect the compression of this pad, an ink-reservoir, strips of felt or other suitable material extending from the ink-reservoir to the inking-pad for supplying ink to the pad by capillary attraction, and a device for compressing these strips, so as to regulate the supply of ink.

The sixth part of the invention consists in the combination, substantially as hereinafter more fully set forth, of a horizontal bar moving longitudinally in guides under the top plate of the machine and having a projection on its extremity, which projection when the bar is moved forward comes over a shoulder on the type-striking rod, a spring attached to this bar for retracting the same, a lever pivoted under the frame and attached to the other end of the bar at right angles thereto, and an adjustable projection on the carriage, which projection strikes the end of the lever, and thus moves the bar, so that the projection on the bar is carried above the shoulder on the type-striking rod and prevents the rod from moving against a type.

The seventh part of the invention consists in the combination, substantially as hereinafter more fully set forth, with a toothed wheel upon the shaft of the roller which carries the paper, of two pawls for rotating the toothed wheel and a device for disengaging these two pawls from the ratchet-wheel.

The eighth part of the invention consists in the combination, as hereinafter more fully set forth, with a flat spring fixed at one end to the top plate of the machine and at the other extending between the paper-carrying roller and the type-bar, a perforation in this extremity, through which perforation the top of the type passes, and a shoulder on the type, which by striking against the spring arrests the further movement of the type and at the same time perfectly centers it.

The ninth part of the invention consists in the combination, substantially as hereinafter more fully set forth, with the frame which carries the paper-roller, of a finger pivoted on the frame on a line with the perforation in the top plate and lying below and back of the paper-roller when the latter is in its normal position, but when the roller is thrown back acted upon by the paper-guide and swung up with the roller, so that the end of the finger indicates upon the face of the roller the place where the next impression will be made.

The accompanying drawings show a typewriting machine which embodies the principle of the invention, in which—

In the several figures the same letters refer to the same parts.

Figure 7:
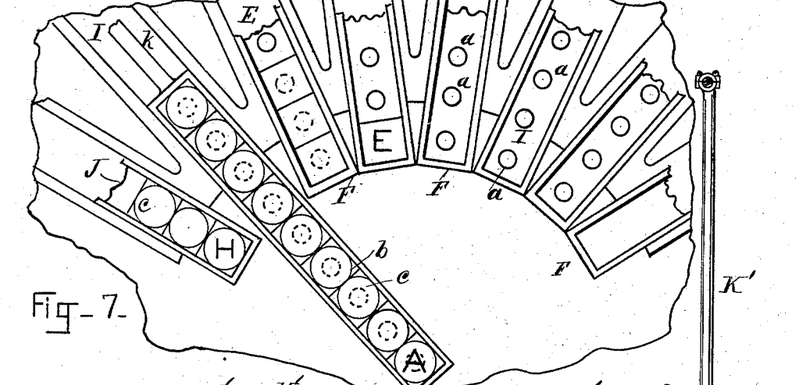
Fig. 7 is a plan view of the type-bars and guiding-ways.
Figure 19:
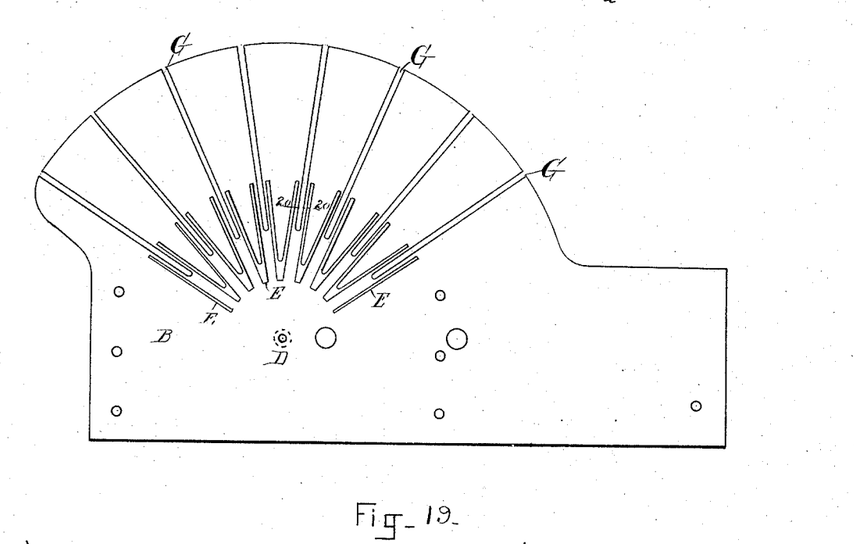
Fig. 19 is a plan view of the top plate, which has upon it the guide for the type-bars.

Referring to the drawings, A is the base-plate of the machine, to which are attached the standards which support the different parts of the machine, and B is a horizontal plate shown in detail on Fig. 19, which plate extends transversely across the bed-plate above the same and is supported upon suitable standards C. A part of this plate is semicircular, and in the center of the circle is a perforation D in the plate, over which perforation each type is brought when an impression is to be made from this type, and through which passes the rod $L^2$, by which the type is forced against the paper. Upon the upper face of this plate and radiating from this central perforation are a series of ways or guides E, each formed by parallel ribs on the plate or in any other suitable manner, in which guiding-ways move the sliding type-bars F. The inner ends of these ways are at equal distances from the central perforation and are contiguous. These guiding-ways extend to the outer edge of the plate; but they will serve their purpose if they extend only part way, as shown in Figs. 7 and 19. A radial slot G in the plate B extends from a point between the inner and outer ends of each of these guides to the edge of the plate, and in these slots move the longer arms H of the bent levers L, and these arms are connected to the type-bars.

Figure 5:
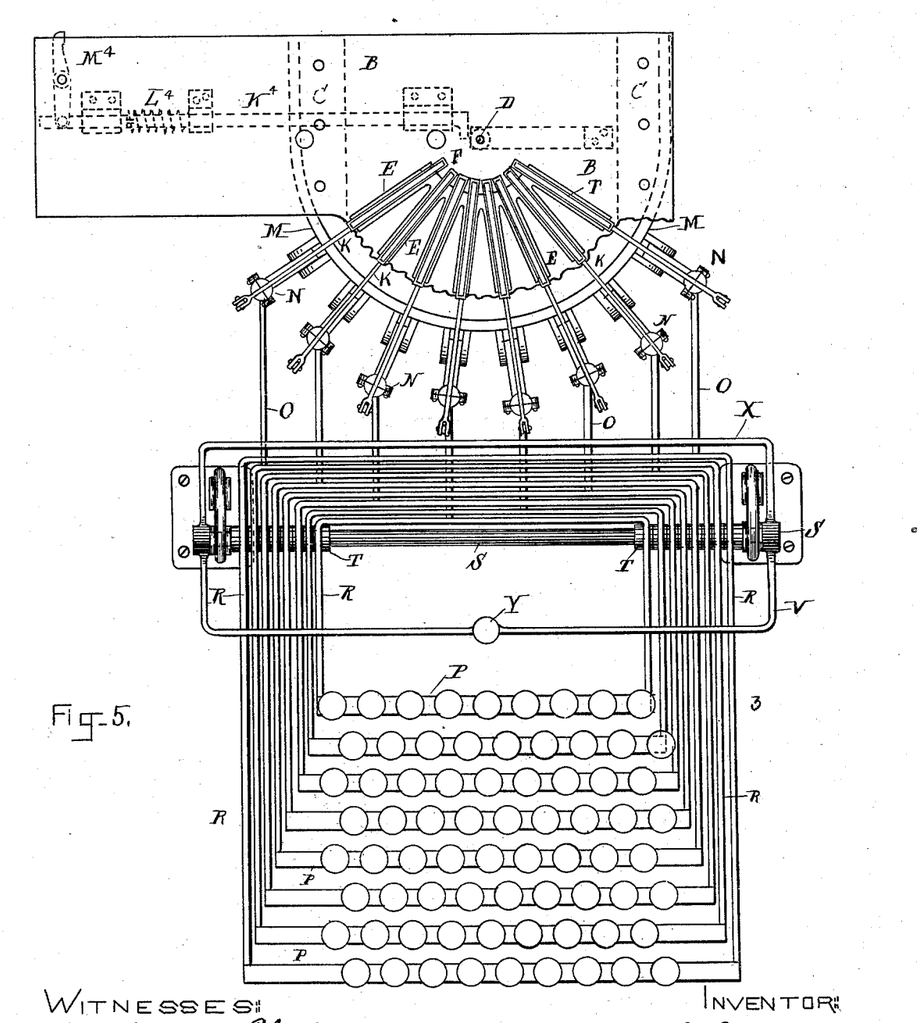
Fig. 5 is a plan view of the keyboard, the key-levers, and the type-bars. Fig. $5^a$ is a perspective view of one of the frames which are acted upon by the finger-keys. Fig. $5^b$ is a detailed view of the universal joint.
Figures 18, 20:
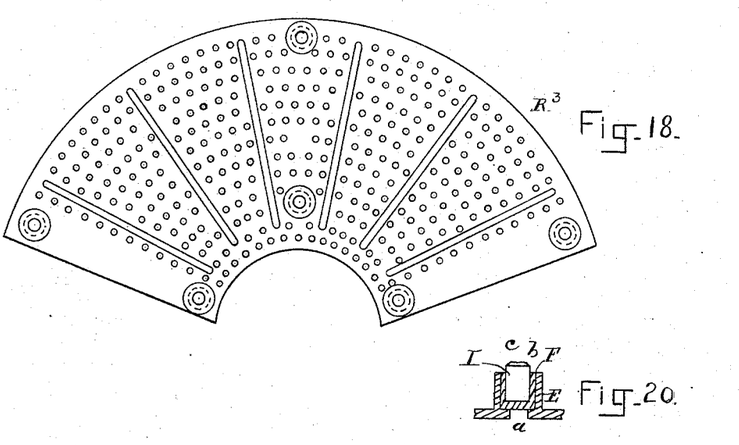
Fig. 18 is a plan view of the perforated plate on the inking-pad.
Fig. 20 is a sectional view of the guides and a type-bar on the line 20 20, Fig. 19.

The type-bars F are shown in Fig. 5 and in detail in Figs. 7 and 20. They are formed with channels I for the reception of one or more independently-movable type, and in the bar under each type is a perforation $a$. The type J are formed with a body $b$, and a raised face $c$, smaller than the body of the type, upon which face is the character on the type. If there is more than one type on a bar, they are placed side by side, and each bar may contain a number of type. It is preferable that each bar should contain the same number of type. I have shown eight bars and nine type in each bar, and this will afford a sufficient number of characters for any ordinary use; but the number of bars and the number of type in each bar may be varied, as may be found desirable. To each of these type-bars is attached a horizontal arm K, which may extend beyond the top plate B. Each of these arms is pivoted, respectively, to the longer and vertically-inclined arm of one of a series of bent levers L, which are pivoted to the semicircular standard M, attached to the front of the bed-plate of the machine, and each of these bent levers is connected by a suitable universal joint N to one of a series of parallel horizontal bars O, which are acted upon by the finger-keys arranged in parallel rows corresponding in number to the number of bars, and each row preferably containing keys having as many characters thereon as there are type in the bars, through horizontal parallel bars P, arranged under each bank or row of keys and depressed by the downward movement of these keys. In order to insure a wide bearing for the movements of these oscillating bars, they are each respectively attached to a frame R, pivoted upon a shaft S, suitably supported on standards on the front of the bed-plate, and these frames are arranged concentrically, so that the front bar P of each frame is successively under a row of keys, and by means of the collars T each frame is supported at two points upon the shaft, thus affording a wide bearing. When the key on any bank or row is depressed, it strikes against the front bar P of the corresponding frame and depresses the bar P, thus correspondingly elevating the other side of the frame and the bar O, attached thereto, and, through the universal joint N, raising the short arm of the lever L and throwing toward the common center of the type-bars the vertically-inclined arm H of the lever L and the horizontal arm K and type-bar F, attached to this arm. The universal joint N, between the levers L and bars O, is preferably of the form shown in Fig. 5$^b$, which consists of a spherical socket $n$ on the lever and a ball $n'$ to fit in said socket on the end of the bar. The socket is elongated to permit play between the parts.

Figure 5A:
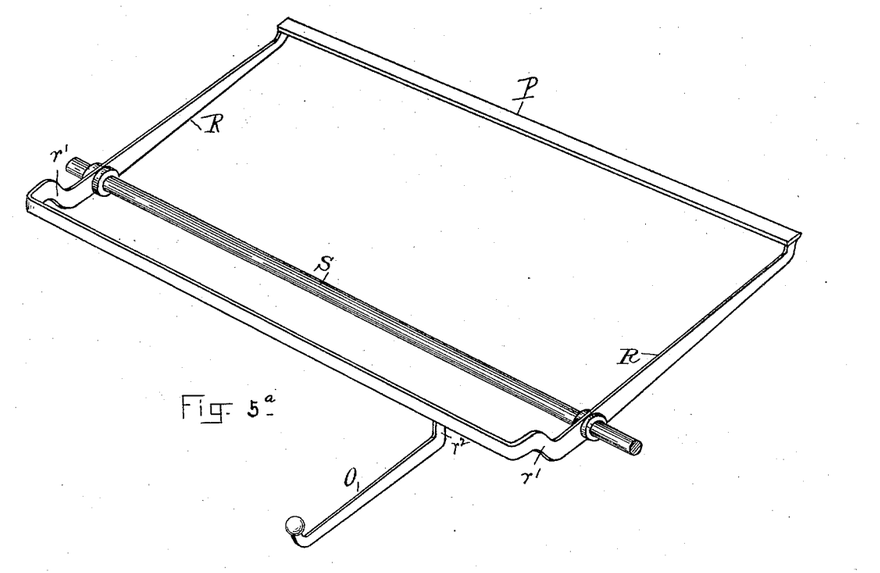
Figure 5B:
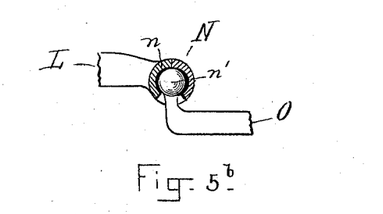
Figure 6:
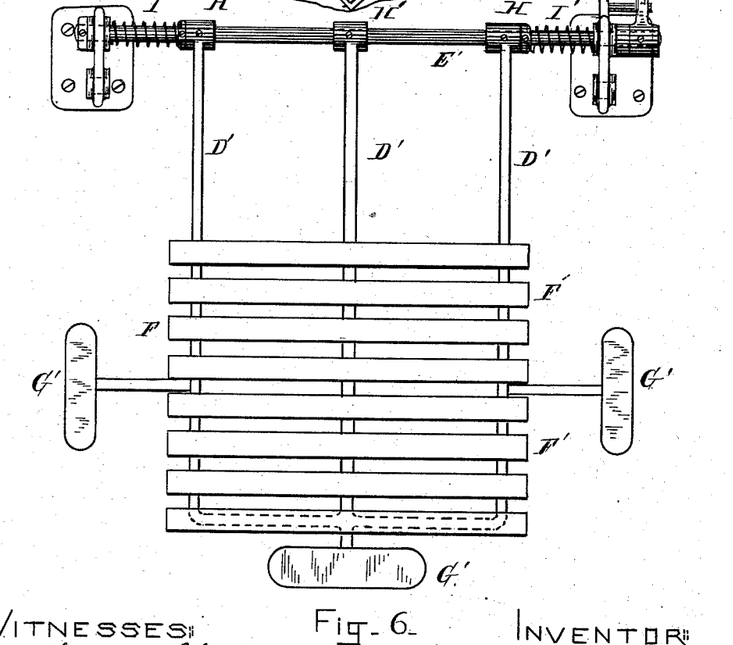
Fig. 6 is a plan view of the mechanism operated by the keys to effect the feeding movement after the impression of a letter.

It is desirable in a type-writing machine, in order that it may be operated with facility and with the minimum amount of fatigue to the operator, that the amount of pressure which is applied to a key in order to effect the impression of a character should be the same for all the keys—that is to say, that the touch upon the keys should be of uniform strength. In the form of type-writing machine described as embodying my invention the several banks of keys are arranged in parallel rows, and consequently the sides of the frame which are depressed by keys in different rows are of different lengths, and the parallel bars O, owing to their connection with the radially-arranged type-bars, are not of equal length. To effect this object, the longer bars O are connected with the frames R, having the longer sides, while the shorter bars are connected with the frames having the shorter sides, the lengths of the frames and bars being so proportioned with respect to each other that the amount of pressure required to operate them is substantially the same for each key. In order to prevent any bar O when thrown up from coming into contact with the sides of the frames R over these bars, each of these frames is bent upwardly, as shown at $r'$, Fig. 5$^a$, thus elevating the rear portion of the frame, and the bars O are connected to the raised portion of the frame by its upwardly-extending portion $r^2$.

Figures 2, 3, 4:
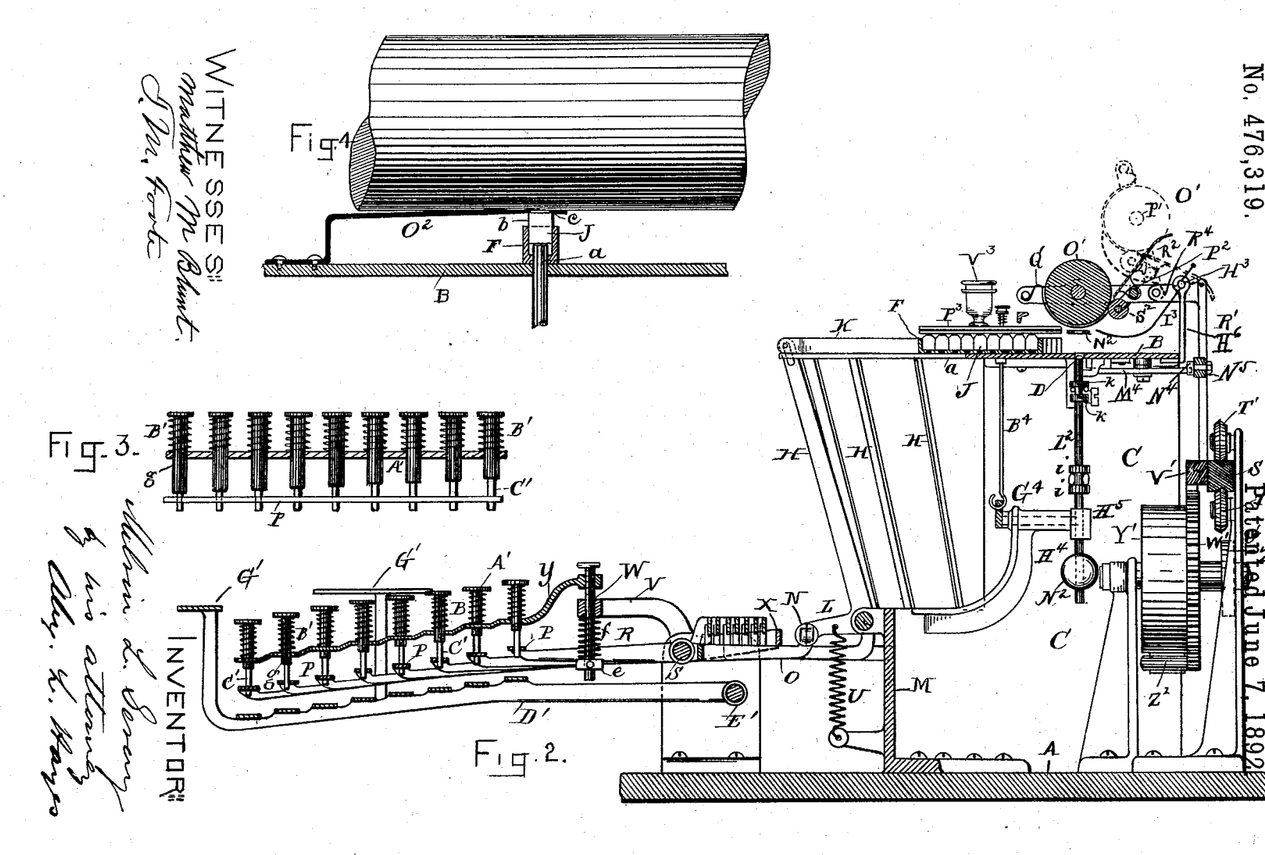
Fig. 2 is a transverse section on the line 2 2, Fig. 1.
Fig. 3 is a sectional view of a row of keys.
Fig. 4 is a view showing a type-bar in section and a part of the paper-roller in elevation.

A suitable retracting-spring U may be attached to each bell-crank lever for the purpose of drawing back the type-bar connected therewith after it has been thrown forward by the depression of a key; but I prefer to derive this retracting force from the action of a device by means of which a conveniently-adjustable retracting force can be obtained. This device is shown in Figs. 2 and 5. It consists of a rectangular frame V, attached by its side bar to each end of the shaft S and having its rear bar X above the bars O and its front bar over the frames R. In the front bar is a vertical rod W, which also passes through the plate $y$, through which the keys pass, and has upon its extremity a screw-thread. Near the lower end of this rod is a collar $e$ and between this collar and the frame is a spiral spring $f$ upon the rod. This spring acts to throw up the front bar of the frame V and to depress the rear bar, and thus acts as a retracting-spring to the bars O, which are under the rear bar of the frame. The tension of this spring may be varied, as may be desired, by screwing up the rod W.

The keys consist of vertical rods A', which move in perforations in the plate y, which plate is preferably inclined. A spiral spring B' between this plate and the head of the key surrounds each key, and in each key is a pin g under the plate, which pin keeps the keys in position. Attached to each rod is a stem C' of smaller diameter than the rod, and this stem passes through a perforation in the bar P under the key, and when the key is depressed makes contact with the lever D', which by its movement also brings into operation the type-striking mechanism and the spacing mechanism; but the perforation on the bar P is of such size that it will not admit the passage of the rod A', and consequently the end of this rod when a key is depressed depresses the bar P and through the mechanism hereinbefore described causes the movement of the corresponding type-bar toward the common center.

When there are several type in a type-bar, it is necessary that the extent of movement of the type-bar should be in accordance with the distance of the type from the end of the type-bar, and consequently that the depression of a key corresponding to any type should produce the proper degree of movement in the type-bar to bring that type to the common center, and this will be effected by a corresponding depression to a greater or less extent of the bar P, depressed by the key over the same. This result is accomplished by successively increasing in the rows of keys the length of the rod A' relatively to the stem C', as shown in Fig. 3, so that the depression of the bar P, caused by each of the keys in the row of keys over the bar, will depend upon the distance from the end of the type-bar moved by the keys in that row of the type corresponding to the key by which the bar P is depressed.

The mechanism hereinbefore described is a suitable device for carrying into effect the principle of my invention—viz., the movement of a series of radial type-bars by means of keys which act when depressed to bring to a common center the type corresponding to the depressed key; but any other suitable mechanism may be used.

Under and parallel to the shaft S and pivoted on suitable standards attached to the bed-plate—as, for example, the standards which support the shaft S—is a rock-shaft E', to which is attached at right angles a frame D', carrying a number of parallel bars F', which are successively under the bars P, and are struck by the ends of the stems C' when these keys are depressed. By the movement of this frame or lever D' the spacing mechanism is operated, and this mechanism operates automatically after the impression of each letter. The depression of this frame also effects through suitable mechanism the release of the force by which the type-striking rod is operated. In order that this spacing mechanism may be operated independently of the movement of the letter-keys, so that longer spaces may be formed between words or between letters by the action of the spacing mechanism independently of the action of the impression mechanism, keys G' are attached to this frame or lever D', by which it may be moved by the operation. For the convenience of the operator there are three of these keys, one in front and one on each side of the frame. The frame is attached to the shaft E' by collars H', fixed on the shaft, and between the end collars are fixed spiral springs I', which act to throw up the frame after it has been depressed. Any other form of retracting-spring may be used. At right angles to the rock-shaft E' and fixed to the same is an arm K', to which is pivoted a vertical rod L', pivoted to a bell-crank lever M' on the standard N', and which lever by its movement determines the movement of the spacing mechanism and the type-striking mechanism.

Figure 1:
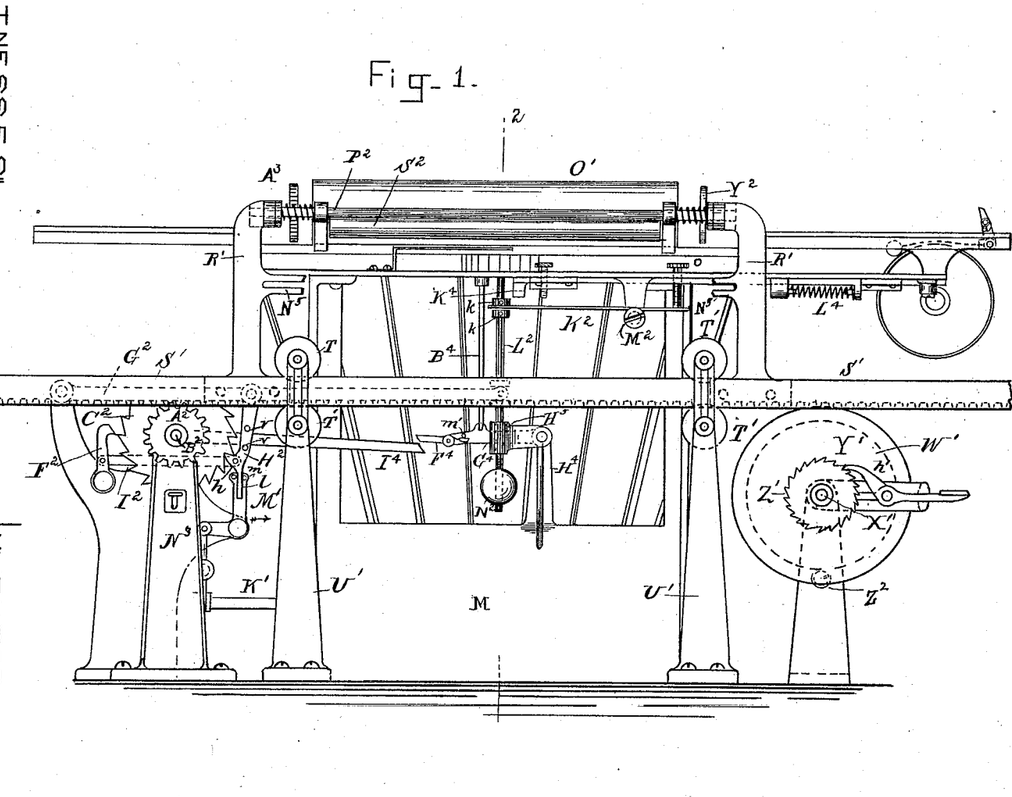
Figure 1 is a rear view of the machine.
Figure 8:
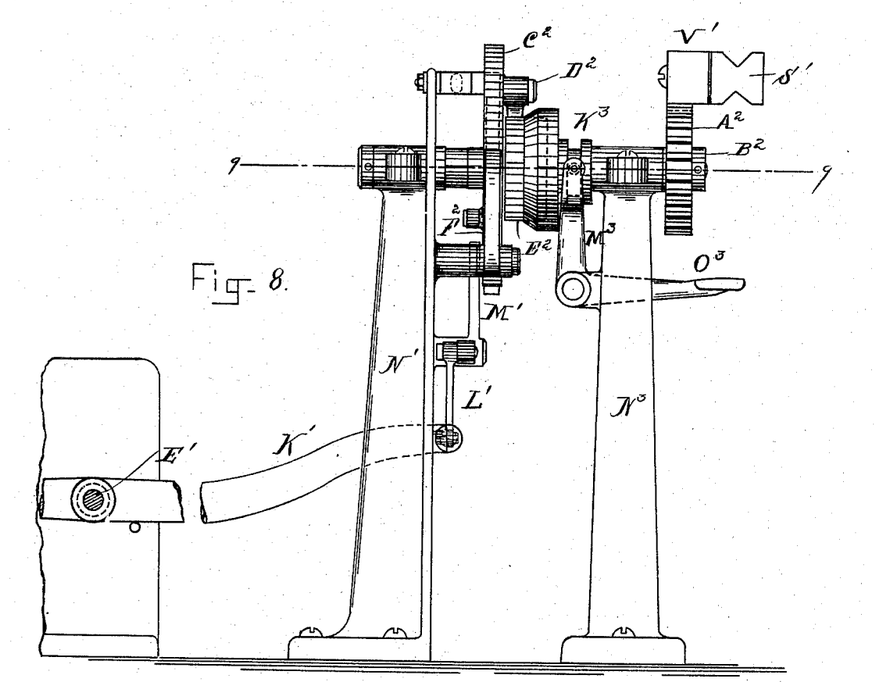
Fig. 8 is a view in elevation of the feeding mechanism.
Figure 9:
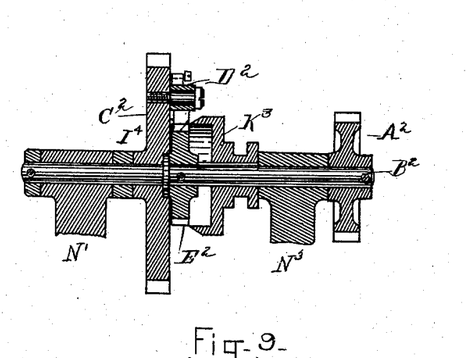
Fig. 9 is a sectional view of the same on the line 9 9, Fig. 8.
Figure 10:
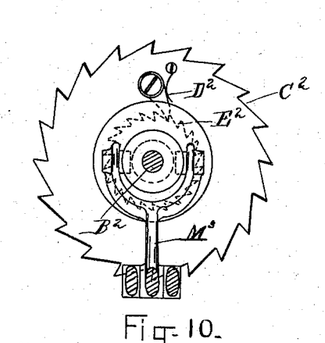
Fig. 10 is a front view of the escapement-wheel which forms part of the feeding mechanism.

The spacing mechanism is shown in Fig. 1 and in enlarged detail views in Figs. 8, 9, and 10.

Figure 11:
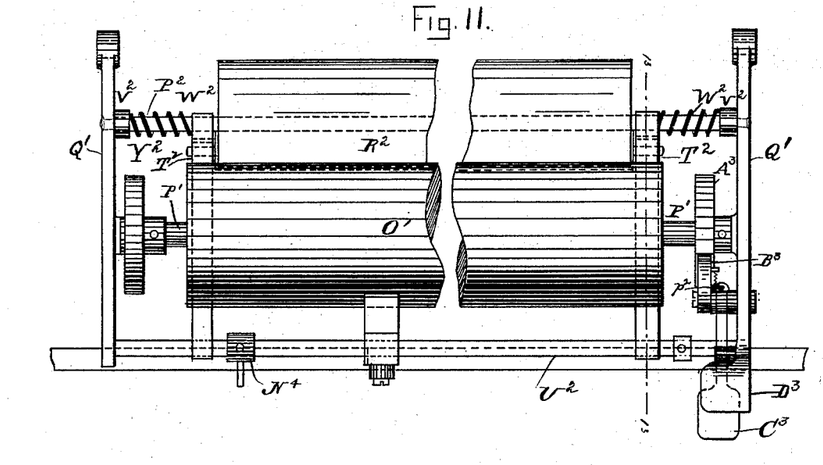
Fig. 11 is a view in elevation of the paper-roller shown as broken and of the mechanism for rotating the same.

Referring to Figs. 1, 2, and 11, O' is the roller which carries the paper, which roller is mounted upon a shaft P', which is pivoted at opposite ends in a rectangular frame composed of the end bars Q' and the front or short bar $U^2$. This frame is hinged to the forwardly-extending arms $R^4$ of the vertical standards R' R', attached to the bar S' at the back of the machine, which bar moves transversely across the machine at right angles to the bars O between suitable rollers T' T', supported upon the standards U' U'. Attached to bar S' and parallel with it is a rack-bar V', the teeth of which engage with a toothed wheel W', fixed on the barrel Y', loose upon the arbor X', supported on a standard and containing a helical spring, one end of which is attached to the arbor and the other to the barrel on the inside of the same. Attached to the barrel is a ratchet Z', and the toothed wheel W' is provided with a handle $Z^2$ for turning the barrel and winding up the spring. A pawl h', attached to the standard, engages with the teeth of this ratchet Z' and prevents its rotation except in one direction. The effect of this spring is to cause the toothed wheel to have a constant tendency to rotate; but this movement, and the consequent longitudinal movement of the carriage by the engagement of the toothed wheel W' with the rack-bar V', is controlled by the mechanism now to be described, the action of which is determined by the movement of the spacing-bars. This mechanism consists of a toothed wheel or pinion $A^2$, engaging with the teeth of the rack-bar and fixed to a shaft $B^2$, supported upon standards N' $N^3$, which are opposite to the standard supporting the barrel Y'. Loose upon the shaft is an escapement-wheel $C^2$, whose teeth have inclined and straight faces, as in many forms of escapement-wheels used in mechanism. This escapement-wheel is connected in the well-known manner to the shaft $B^2$ by means of a pawl $D^2$, pivoted to the wheel, and a ratchet-wheel $E^2$, fixed to the shaft $B^2$; but this pawl can be thrown out of engagement with the teeth of the ratchet-wheel by means of a device hereinafter to be described. To the standard $N'$, which supports the shaft $B^2$, is pivoted an upright pawl $F^2$, the end of which is bent horizontally and is beveled off. This pawl is in position, when moved horizontally, to engage with the teeth of the escapement-wheel. To the standard $N'$ is also pivoted a horizontal bar $G^2$, which extends above the shaft $B^2$, parallel with the rack-bar $V'$, and is connected to the type-striking rod $L^2$. This connection is made by means of a fork on the end of the bar $G^2$, which lies between collars $i\ i$ on the type-striking rod $L^2$. Pendent from the bar $G^2$ is an arm $H^2$, upon which is a tooth $h$, which is in the path of the escapement-wheel on the side opposite to the pawl $F^2$, and which projection by engaging with a tooth upon the escapement-wheel prevents the rotation of this wheel. This arm is connected by the bar $I^2$ to the pawl $F^2$, so that the arm and pawl are simultaneously moved. The arm has an extension $l$, which is connected to the bell-crank lever $M'$, a convenient manner of effecting the connection being by means of two pins $m\ m$ on the lever, between which lies the extension $l$. When the frame $D'$ is depressed by the depression of one of the letter-keys or by the keys $G'$, attached to the frame, the bell-crank lever $M'$ is moved in the direction of the arrow by means of its connections, and by its movement disengages the tooth $h$ from the escapement-wheel, while at the same time the end of the pawl $F^2$, by means of its connection with the arm $H^2$, engages with the escapement-wheel on the other side and prevents its rotation and the consequent rotation of the pinion $A^2$ and the longitudinal movement of the rack-bar $V'$ engaging with this pinion. On the disengagement of the tooth $h$ from the escapement-wheel the arm $H^2$ and bar $G^2$ are free to move, and the spring $K^2$, attached to the type-striking rod $L^2$ and acting to throw up this rod, is permitted to operate and throws up the end of the rod through the perforation $D$ in the plate $B$ against the bottom of the type, which by the movement of the type-bar consequent upon the depression of a key corresponding to the type has been brought over this perforation, as has before been explained. An impression is thus made on the paper. The end of this spring $K^2$ rests loosely between the two collars $k\ k$ on the rod, and is so adjusted that it does not completely follow the full movement of the rod required to force the type onto the paper, but the type is thrown against the paper during the last portion of the stroke of the rod by the inertia of the rod, and after the impression the rod, by its reaction, leaves the type and returns to the spring. On the release of the letter-key or the key on the frame the bell-crank lever $M'$ returns to the first position, and by means of the movement of the bar $I^2$ the end of the pawl $F^2$ is removed from the escapement-wheel, and by the release of this escapement through the pinion $A^2$ the force which rotates the toothed wheel $W'$ is permitted to act to move the rack-bar and carriage longitudinally until the arm $H^2$, by the action of the tooth of the escapement-wheel on the tooth $h$, is carried back to its original position, and the type-striking rod is again locked. The escapement-wheel thus moves tooth by tooth and the distance between the successive teeth is such that the movement of the rack-bar and carriage is sufficient after each impression to form spaces of proper length between the letters. When the frame $D'$ is depressed by a key $G'$ on the frame, an impression is not made, for the reason that a type has not been brought over the perforation on the plate $B$ and the type-striking rod works idly.

I have shown a flat spring $K^2$, pivotally secured near one end to a pendant $M^2$ from the plate $B$ and the other end secured between collars $k\ k$ on the rod $L^2$, as affording the force to throw up this rod; but any other device for obtaining this force may be used. The power of the spring may be regulated by means of a set-screw $o$ in the plate $B$ and bearing upon the shorter end of the spring. The rod moves in a guide $H^5$ on a standard $H^4$, attached to the standard $M$. A weight $N^2$ may be placed on the end of the rod to give momentum to the rod when it is desired to increase the force of impact on the type, as for making carbon copies.

It will be seen that on this machine the necessary power required to move the heavy carriage is derived from a strong spring, and the power required to strike the type with sufficient force to form a clear impression is derived from the spring $K^2$ or its equivalent, while as the letter-keys merely act to move the type-bars and release the force of these springs and as the movement of the type-bars and of the mechanism which acts to release the force of these springs is effected through systems of levers, but little power is required to operate the keys. The force which is applied to the type-striking rod is independent of that which is applied to the keys, and, inasmuch as the spring $K^2$ always acts with the same power, all the type will be impressed with the same force upon the paper, and this force will not depend upon the strength of the touch upon the keys.

In order that the type may be quickly removed from the paper after an impression is made, so as to avoid a blurred impression, I use the device shown in Fig. 4. This consists of a flat spring $O^2$, which is attached at one end to the plate $B$, while its other end is free and extends under the roller and over the type. In this end is a perforation which will admit the head $c$ of the type, but not the body $b$ of the type. The spring therefore rests upon the type and acts by its elasticity after the type has been thrown up by the striking-rod L² to withdraw the type from the face of the roller.

The roller is represented as cylindrical; but it is preferable to make it polygonal in order to afford a flat surface for the type to strike against. This polygonal form of the roller has been adopted in the later type-writing machines.

Figure 12:
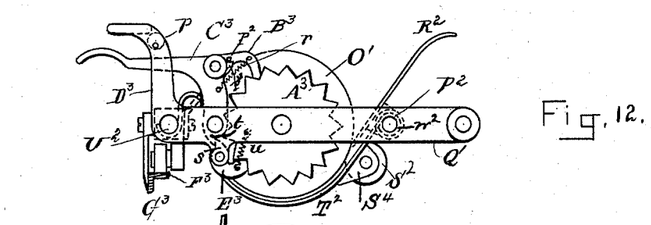
Fig. 12 is a view in end elevation of the mechanism for rotating the roller.
Figure 13:
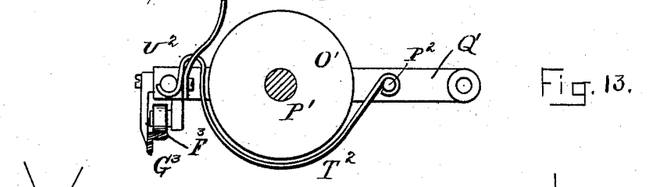
Fig. 13 is a sectional view of the same on the line 13 13, Fig. 11.
Figure 14:
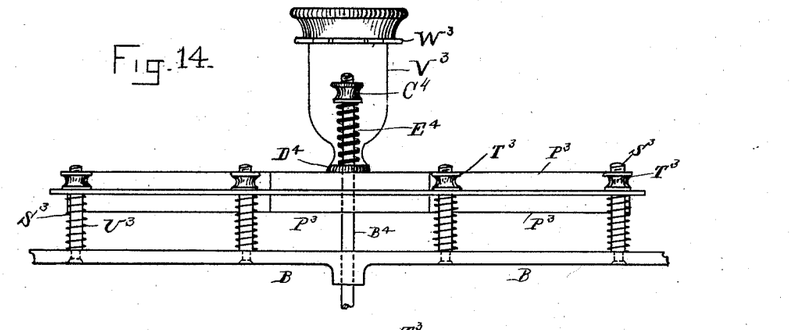
Fig. 14 is a view in elevation of the inking device.
Figure 15:
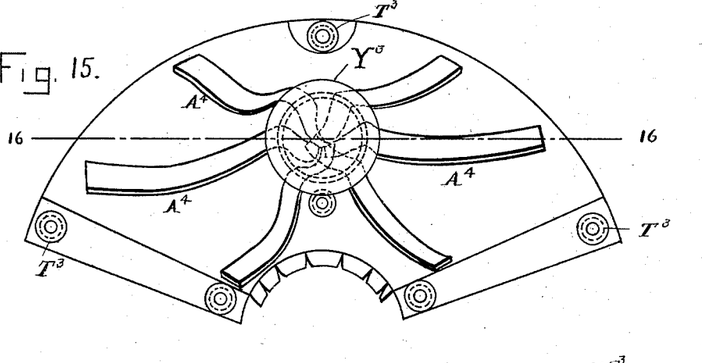
Fig. 15 is a plan view of the same.

P² is a shaft which is supported on the bars Q' of the roller-frame behind the roller O', and this shaft has attached thereto a plate of metal R², which supports the paper U under the roller-frame, and properly supported in ears S⁴ on the metal bands T², Fig. 12, is a roller S², between which and the roller O' the paper passes, and this paper is kept against the paper-roller by the metal bands T², which are attached at one end to the shaft P² and hook over the shaft U² in front of the roller.

On the shaft P² at each end and attached to collars V² on the shaft are spiral springs W², attached at their inner ends to the shaft, whereby the shaft is given a yielding elastic movement.

The shaft P', which supports the paper-roller, has at one end a milled wheel Y², by means of which the shaft can be rotated, and on the other end a toothed wheel A³, which is rotated by means of a pawl B³. This device is shown in detail in Fig. 12. Referring to this figure, C³ is a bent lever, which is pivoted at its shorter end to the bar Q', while its longer end extends toward the front of the machine and has a handle by means of which it can be grasped. Extending above the handle of this lever is an arm D³, attached to or forming part of the bar Q', which arm also is provided with a handle, so that the arm D³ and lever C³ can be grasped between the thumb and finger of the operator. The pawl B³ is pivoted to the outer angle of the lever C³, and is connected to the same by a spring r, and is limited in its movement under the tension of the spring by a pin $p^2$ on said pawl, which abuts against a lug $p^3$ on the lever. This pawl engages with the teeth of the toothed wheel A³. A holding-pawl E³ is pivoted to the under side of the bar Q' and enters between the teeth of the wheel A³. This pawl E³ has a dog s, which bears against a similarly-shaped dog or arm t of the lever C³, so that when said lever is depressed the pawl will be disengaged from the ratchet A³. By pinching together the lever C³ and arm D³ the pawl B³ acts to rotate the wheel A³, the spring acting to press the pawl E³ into the teeth, and the roller is thus rotated to form spaces between the lines. The lever C³ can be pulled down to free the pawl B³ and to permit the roller to be rotated by the milled wheel on its shaft.

On the arm D³ over the arm C³ is a cam p, which by being rotated determines the extent of the upward movement of the lever C.

To the front of the paper-roller frame, on its under side, is attached a bracket having a roller F³, which moves on a rail G³, supported on the main frame of the machine. A rock-shaft H³ extends parallel with and behind the paper-roller frame and supported in standards H⁶, secured to the plate B. Attached to this shaft is a bent finger I³, the shorter end of which projects above the rock-shaft and the other extends under the roller, and this extremity is on a line with the perforation D, through which the type is struck. When the paper-roller is tilted back, the paper-support strikes the short end of this finger, and the other end is brought up against the paper, and indicates the place where the next impression on the paper will be made.

When it is desired to carry back the carriage in order to commence a new line, it will be necessary to permit the pinion A² to rotate without rotating the escapement-wheel C². This is effected by disengaging the pawl D² from the ratchet-wheel E². A convenient device for effecting this result is the sliding collar K³, which is moved longitudinally by the fork M³, pivoted to the standard N³ and operated by the lever O³, attached to the fork and extending out from the standard. The end of this collar is beveled off, and this beveled end fits between the pawl and ratchet, so that when the collar is moved upon the shaft the beveled end will separate the pawl from the ratchet.

The inking mechanism is shown in detail in Figs. 14, 15, 16, 17, and 18. It consists of two superimposed pads P³ of felt or other similar material, which are separated from one another by a perforated plate of metal R³ and supported above the type-bars by vertical rods S³, which are fixed on the plate B and extend through the pads and the plate R³. On the upper end of each rod is a nut T³, and on each rod between the nut and the plate B is a spiral spring U³, the effect of which is to cause the pad to bear upon the type with a yielding pressure when said pad is drawn down against the type, which pressure can be adjusted to any desired extent.

Figures 16, 17:
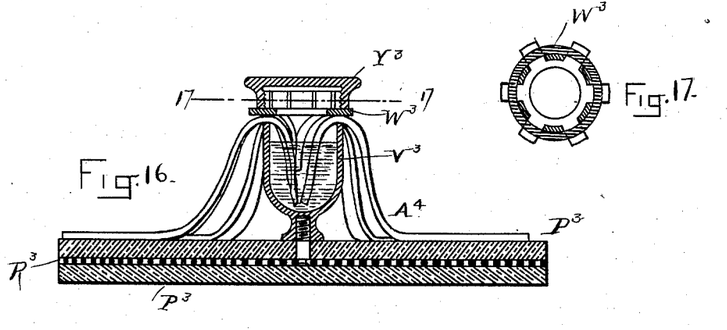
Fig. 16 is a sectional view of the same.
Fig. 17 is a horizontal sectional view on the line 17 17, Fig. 16.

V³ is the ink-receptacle supported above the pads. The rim of this receptacle is denticulated, as shown in Fig. 17, and into these denticulations fit the teeth of a horizontal ring W³, which is forced down by the screw-cap Y³ of the receptacle. Strips of felt or other suitable material A⁴ pass from the receptacle to the pad P³ through the denticulations on the rim and by capillary attraction convey the ink to the pad. The supply can be regulated by the pressure of the ring W³ upon the strips. A rod B⁴ passes through the pads P³ and a washer D⁴ on the upper surface of the upper pad. On the end of this rod is a nut C⁴ and on the rod between the nuts C⁴ and washer D⁴ is a spiral spring E⁴. This rod B⁴ is attached to a horizontal lever G⁴ under the top plate B and pivoted to the vertical standard H⁴, attached to the frame M.

Pivoted to the end of the lever G⁴ is a lever F⁴, having a beveled extremity which engages with the extremity of a lever I⁴, pivoted on the shaft B² and lying between two pins $v$ $v$ on the arm H². When the lever I⁴ is carried up by the upward movement of the arm H², the beveled end of this lever passes by the beveled end of the lever F⁴; but on the return of the lever I⁴ its extremity engages with the end and the lever or latch F⁴ and depresses the end of the lever G⁴, a pin $m'$ on said lever preventing the movement of the other end of the latch. The depression of the lever G⁴ draws down the rod B⁴ and compresses the pads, thus forcing ink onto the type. The office of the spring E⁴ is to regulate the extent of this compression.

In order to insure lines of equal length and to prevent the printing of one letter over another at the end of a line, I support under the plate B a sliding horizontal rod K⁴, which at one end is provided with a projection and at the other end is attached to the end of a lever M⁴, pivoted on the plate at right angles to the rod and projecting from the plate. A projection N⁴, sliding on the rod N⁵ on the standards R' R' and adjustable thereon, engages with the end of the lever M⁴, and moves the end of the rod K⁴ over the collar $k$ on the type-striking rod, so that the latter is prevented from moving upward when a type is struck. A spring L⁴ on the rod K⁴, fixed between two of its supports, insures the return of the rod.

Having thus described my invention, what I claim, and desire to secure by Letters Patent of the United States, is—

1. In a type-writing machine, the combination of a movable type-bar, a series of type supported on said bar, each of said type being independently movable with respect to each other and with respect to the bar, a series of keys corresponding in number to said type, means constructed so as to be engaged by each of said keys and to bring a given type, respectively, to a common printing-point upon the depression of a key, and means for striking the type to impress the same upon a printing-surface.

2. In a type-writing machine, the combination of a movable type-bar, a series of type supported on said bar, each of said type being independently movable with respect to each other and with respect to the bar, a series of keys corresponding in number to said type, each of said keys constructed with a rod A', adapted to engage and move a bar P and its supporting pivoted frame R a distance varying from that effected by the operation of the other keys, the said bar P and frame R, and lever L, connected with the frame R and the movable type-bar, substantially as shown and described, whereby the depression of each key will bring a given type, respectively, to a common printing-point, and means for striking the type to impress the same against a printing-surface.

3. In a type-writing machine, the combination, substantially as and for the purpose set forth, of a series of horizontal bars supported in suitable guides upon a plate and moving in lines radiating from a common center in the plate, one or more independently-movable type supported on each bar, a perforation in each bar under each type, a perforation in the plate at the common center from which the bars radiate, a rod moving vertically through this perforation and acting to impress the type upon the paper, keys having characters thereon corresponding to the type, and mechanism whereby the depression of a key causes the corresponding type to be brought to the common center and the type-striking mechanism to be operated.

4. In a type-writing machine, the combination, substantially as and for the purpose set forth, of a series of horizontal bars moving in suitable guides upon a plate in lines radiating from a common center and each supporting a series of independently-movable type, a series of vertically-inclined bent levers pivoted in a semicircle upon a suitable support under the plate, each respectively connected by its vertical arm to one of the type-bars and by its shorter arm to one of a series of horizontal parallel arms, a device for retracting each bent lever, a series of concentric quadrangular frames independently pivoted upon a common shaft and each connected to one of the horizontal arms, a series of rows of vertically-moving keys, each row arranged, respectively, over the front bar of a frame, and the number of keys in a row corresponding to the number of type in the bar and each key marked with a character corresponding to the character upon a type and acting when depressed to move by the depression of a corresponding frame and the movement of a corresponding bent lever the type-bar corresponding to the row of type and to bring to the common center of the plate the type corresponding to the character on the depressed key.

5. In a type-writing machine, the combination, substantially as and for the purpose set forth, of a frame pivoted under the keys, the mechanism for operating the type-striking rod, mechanism for moving the carriage, and means connecting said mechanisms with the pivoted frame, whereby the depression of a letter-key depresses the pivoted frame and releases the said type-striking rod and the carriage-moving mechanisms.

6. The combination, substantially as and for the purpose set forth, with the concentric frames R, of the frame V, pivoted on the shaft S and extending across the frame R, the rod W in the front bar of the frame, the collar $c$ on the rod, and the spring $f$ on the rod between the collar and the front bar of the frame.

7. In a type-writing machine, the combination, substantially as and for the purpose set forth, of the type-striking rod moving vertically in a suitable guide under the action of a spring, a paper-roller carriage moving longitudinally under the action of a spring, a rack-bar on the carriage and engaging with a pinion upon a shaft, the said pinion and shaft, a lever acting to move the type-striking rod, and mechanism connected with the said lever and the said shaft and with the spacing-lever, the said mechanism being operated by the spacing-lever to permit the movement of the type-striking rod and the carriage.

8. The combination, substantially as and for the purpose set forth, of the carriage moving longitudinally under the action of a spring or other suitable power, the rack-bar V' on the same, the pinion $A^2$, fixed on the shaft $B^2$ and engaging with the rack-bar, the escapement-wheel $C^2$, loose upon the shaft $B^2$, but connected thereto, the lever $G^2$, pivoted at one end and at the other carrying the type-striking rod $L^2$, a spring acting upon the rod to elevate the same, the arm $H^2$, pivoted to the lever $G^2$ and carrying a projecting tooth $h$, which engages with the escapement-wheel, the bent arm M', operated by the spacing-lever and acting when said lever is depressed to move the arm $H^2$ and disengage the pawl $h$ from the escapement-wheel, and the pivoted pawl $F^2$, engaging with the other side of the escapement-wheel and suitably connected to the lever $H^2$.

9. The combination, substantially as and for the purpose set forth, of the type-striking rod $L^2$ and the adjustable spring $K^2$, supported on the pendant $M^2$ and connected by one end to the rod $L^2$.

10. The combination, substantially as and for the purpose set forth, of a type loosely supported on a bar F and having a body $b$ and elevated face $c$, smaller than the body, a type-striking rod, a spring $O^2$, fixed at one end to the plate B and the other resting upon the body $b$ of the type and provided with a perforation through which the face of the type projects.

11. The combination of the frame carrying the toothed wheel $A^3$, the pivoted lever $C^3$, provided with a short fixed arm or lug $t$ and carrying the pawl $B^3$, engaged with said toothed wheel, and the pivoted holding-pawl $E^3$, also engaging said wheel $A^3$ and having a dog $s$, adapted to be engaged by the arm $t$ of the lever $C^3$ by the downward movement of the latter to disengage said pawl $E^3$, substantially as shown and described.

12. The combination, substantially as and for the purpose set forth, of the pads $P^3$ $P^3$, the perforated plate $R^3$ between the same, the plate B, the rods $S^3$, fixed on the plate B and extending through the pads, the nuts $T^3$ and springs $U^3$ on the rods $S^3$, and means for pressing the inking-pads against the type by the descent of the type-striking rod.

13. The combination, substantially as and for the purpose set forth, of the rod $B^4$, passing through the inking-pad, the nut $C^4$ and washer $D^4$ on this rod, the spring $E^4$ on the rod between the washer $D^4$ and nut $C^4$, the pivoted lever $G^4$, attached to the lower end of the rod $B^4$, the latch-lever $F^4$, and the arm $I^4$, engaging with the latch-lever and connected to the arm $H^2$.

14. The combination, substantially as and for the purpose set forth, of the ink-receptacle $V^3$, provided with a denticulated rim, the strips of felt or other suitable material lying on these denticulations and extending from the ink-receptacle to the ink-pad, the toothed ring $W^3$, and the screw-cap $Y^3$.

15. The combination, substantially as and for the purpose set forth, of the rod $K^4$, moving longitudinally under the plate B, a collar on the type-striking rod, which when the rod $K^4$ is moved comes under this rod and prevents the upward movement of the type-striking rod, a retracting-spring connected to the rod $K^4$, a pivoted lever $M^4$, connected at one end to the rod $K^4$ and having its other end projecting from the plate, and a projection on the paper-roller carriage adapted to strike the projecting end of the lever $M^4$.

16. The combination, substantially as and for the purpose set forth, of the rod $K^4$, moving longitudinally under the plate B, a collar on the type-striking rod, which when the rod $K^4$ is moved comes under this rod and prevents the upward movement of the type-striking rod, a retracting-spring connected to the rod $K^4$, a pivoted lever $M^4$, connected at one end to the rod and having its other end projecting from the plate, and an adjustable projection on the carriage, which projection strikes the projecting end of the lever $M^4$.

17. The combination, substantially as and for the purpose set forth, with the paper-support, of the finger $I^3$, attached to the rock-shaft $H^3$ and extending under the paper-roller and having its extremity on a line with the common center, and an arm on the rock-shaft, which when the roller is thrown back is struck by the paper-support and acts to throw up the arm $I^3$.

In testimony whereof I have signed my name to this specification, in the presence of two subscribing witnesses, on this 31st day of December, A. D. 1889.

MELVIN L. SEVERY.

Witnesses:
 ALEX. L. HAYES,
 CHAS. F. HOWE.